(12) United States Patent
Leonard et al.

(10) Patent No.: US 10,267,691 B2
(45) Date of Patent: Apr. 23, 2019

(54) AGGREGATED PULSE PHASE DIFFERENCE TORQUE DETERMINATION SYSTEM AND METHOD

(71) Applicant: Deere & Company, Moline, IL (US)

(72) Inventors: Jared F. Leonard, Evansdale, IA (US); Robert J. White, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/432,556

(22) Filed: Feb. 14, 2017

(65) Prior Publication Data
US 2018/0003578 A1    Jan. 4, 2018

Related U.S. Application Data

(60) Provisional application No. 62/357,301, filed on Jun. 30, 2016.

(51) Int. Cl.
  *G01L 3/02*    (2006.01)
  *B60R 16/023*  (2006.01)
  *G01P 3/00*    (2006.01)

(52) U.S. Cl.
  CPC ............ *G01L 3/02* (2013.01); *B60R 16/0232* (2013.01); *G01P 3/00* (2013.01)

(58) Field of Classification Search
  CPC ..... G01L 3/02; G01L 3/00; G01L 3/10; B60R 16/0232; G01P 3/00

(Continued)

(56) References Cited

U.S. PATENT DOCUMENTS 3,906,327 A * 9/1975 O'Callaghan ............. H02P 5/56
                                                    318/603
4,020,685 A   5/1977 Van Millingen et al.
(Continued)

FOREIGN PATENT DOCUMENTS

DE     102017003100 A1    10/2017

OTHER PUBLICATIONS

Kevin Jost, Bosch Torque Sensor for e-Steering, Focus on Electronics, AEI, Jul. 2002.
(Continued)

*Primary Examiner* — Jonathan M Dunlap
*Assistant Examiner* — Octavia Hollington
(74) *Attorney, Agent, or Firm* — Klintworth & Rozenblat IP LLC

(57) ABSTRACT

A system and method determines torque applied to a rotating shaft by a load. Two sensors determine the rotation of the shaft at two spaced-apart axial positions. Controller(s) analyze two pulse trains associated with signals received from the sensors corresponding to rotation of the shaft at the respective axial positions under the load. The controller(s) determine a delta phase value for each pulse of one pulse train with respect to a corresponding pulse of another pulse train, and aggregate each delta phase value for a prescribed period of pulses to determine an aggregate delta phase value. The controller(s) determine a load phase value as a ratio of the aggregate delta phase value to the prescribed period, a total delta phase value as a difference between the load phase value and a reference phase value, and a torque value from the load based on the total delta phase value and physical parameters of the shaft.

13 Claims, 4 Drawing Sheets

(58) Field of Classification Search
USPC ....... 73/862.191, 862.321, 862.327, 862.325
See application file for complete search history.

(56) References Cited

U.S. PATENT DOCUMENTS

| | | | | |
|---|---|---|---|---|
| 5,067,355 | A * | 11/1991 | Witte | G01L 3/109 73/112.01 |
| 5,195,382 | A | 3/1993 | Peilloud | |
| 5,438,882 | A * | 8/1995 | Karim-Panahi | G01L 3/109 73/650 |
| 5,596,153 | A | 1/1997 | Bulgrien et al. | |
| 5,631,592 | A | 5/1997 | Schwarz et al. | |
| 5,903,462 | A | 5/1999 | Wagner et al. | |
| 6,564,653 | B2 | 5/2003 | Desbiolles | |
| 7,860,665 | B2 * | 12/2010 | Parrish | G01L 3/109 702/41 |
| 8,001,848 | B2 | 8/2011 | White et al. | |
| 8,666,682 | B2 | 3/2014 | LaVigne et al. | |
| 9,151,685 | B2 * | 10/2015 | Li | G01L 3/02 |
| 2009/0312959 | A1 | 12/2009 | Borman | |
| 2013/0218426 | A1 | 8/2013 | Li et al. | |

OTHER PUBLICATIONS

Bill Meier et al., Developments in Continuous Torque Monitoring Couplings, Ethylene Producer's Conference, Apr. 26, 2006.
M. Grimsel et al., A Low-Cost Device for Torque Measurement in Drive Trains of Agricultural Machinery, unknown late, admitted prior art.
Magnetoelastic Devices, Inc., The New Standard for Torque Sensing, An Introduction to Magnetoelastic Technology, 1998.
R.D. Van Millingen et al., Phase Shift Torquemeters for Gas Turbine Development and Monitoring, The American Society of Mechanical Engineers, 1991.
German Patent and Trade Mark Office, Search Report in German Patent Application No. 10 2017 207 242.3 dated Apr. 24, 2018.

* cited by examiner

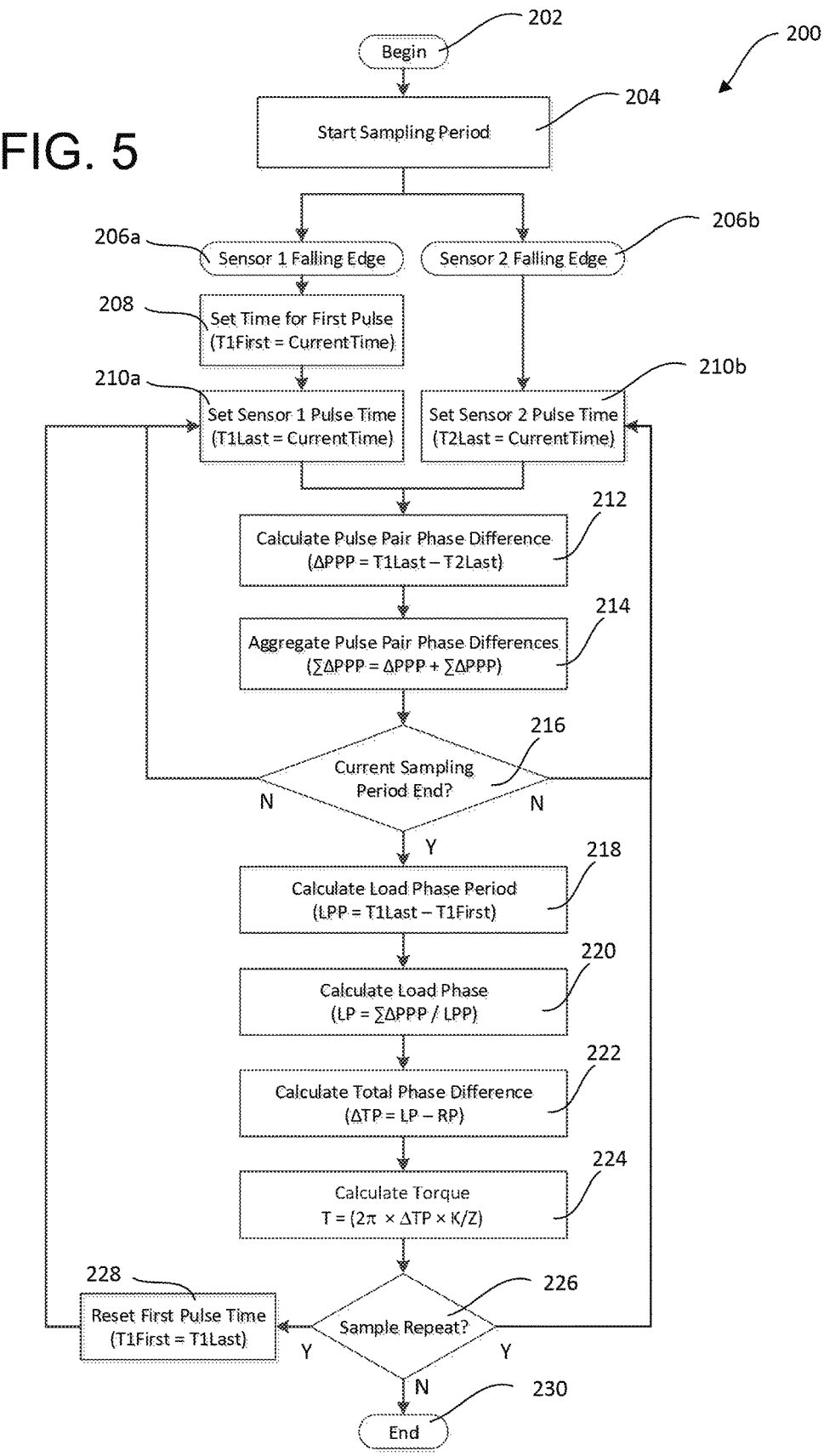

AGGREGATED PULSE PHASE DIFFERENCE TORQUE DETERMINATION SYSTEM AND METHOD

CROSS-REFERENCE TO RELATED APPLICATION(S)

This application claims priority to provisional application Ser. No. 62/357,301, filed Jun. 30, 2016.

STATEMENT OF FEDERALLY SPONSORED RESEARCH OR DEVELOPMENT

Not applicable.

FIELD OF THE DISCLOSURE

This disclosure pertains to a system and method for determining the magnitude of torque applied to a rotating shaft in a work vehicle.

BACKGROUND OF THE DISCLOSURE

Various work vehicles, such as used in the agriculture, construction and forestry (and other) industries, use rotating shafts to transmit power from the power source (e.g., internal combustion engine) to various driveline, work implement or other load components. The torque supplied by the power source may, for example, be directed through a transmission system in order to alter (e.g., increase) the delivered torque. The (estimated or actual) amount of torque delivered to the load components may be important data for various vehicle control systems as well as to reduce the occurrence of exceeding the torque capacity of vehicle components (e.g., shafts or subsequent load components). Inaccurate torque assessment may thus lead to various inefficiencies in vehicle operation and the use of load components with torque capacities in excess of that required for a given vehicle system.

SUMMARY OF THE DISCLOSURE

This disclosure provides a system and method for determining the torque applied to a rotating shaft by an analysis of the phase difference of each of multiple pulse trains generated by rotation of the shaft.

In one aspect, the disclosure provides a method of determining torque applied to a rotating shaft by a load. The method includes detecting, via a first sensor, a rotation of the shaft at a first axial position, and detecting, via a second sensor, a rotation of the shaft at a second axial position axially spaced from the first axial position. The method also includes analyzing, via one or more controllers, a first pulse train associated with a signal received from the first sensor corresponding to rotation of the shaft at the first axial position under the load, and analyzing, via the one or more controllers, a second pulse train associated with a signal received from the second sensor corresponding to rotation of the shaft at the second axial position under the load. The method further includes determining, via the one or more controllers, a delta phase value for each pulse of the first pulse train with respect to a corresponding pulse of the second pulse train, and aggregating, via the one or more controllers, each delta phase value for a prescribed period of pulses to determine an aggregate delta phase value. The method further includes determining, via the one or more controllers, a load phase value as a ratio of the aggregate delta phase value to the prescribed period, determining, via the one or more controllers, a total delta phase value as a difference between the load phase value and a reference phase value, and determining, via the one or more controllers, a torque value from the load based on the total delta phase value and physical parameters of the shaft.

In another aspect the disclosure provides a system for determining torque applied to a rotating shaft by a load in which a first sensor is configured to detect rotation of the shaft at a first axial position, and a second sensor is configured to detect rotation of the shaft at a second axial position axially spaced from the first axial position. The system includes a controller having one or more processors configured to: analyze a first pulse train associated with a signal received from the first sensor corresponding to rotation of the shaft at the first axial position; analyze a second pulse train associated with a signal received from the second sensor corresponding to rotation of the shaft at the second axial position; determine a delta phase value for each pulse of the first pulse train with respect to a corresponding pulse of the second pulse train; aggregate each delta phase value for a prescribed period of pulses to determine an aggregate delta phase value; determine a load phase value as a ratio of the aggregate delta phase value to the prescribed period; determine a total delta phase value as a difference between the load phase value and a reference phase value; and determine a torque value from a load applied to the shaft based on the total delta phase value and physical parameters of the shaft.

In yet another aspect the disclosure provides a system for determining torque applied to a rotating shaft by a load in which a first wheel is coupled to the shaft at a first axial position, the first wheel having a periphery with one or more first repeating target surfaces, and a second wheel is coupled to the shaft at a second axial position axially spaced from the first axial position, the second wheel having a periphery with one or more second repeating target surfaces. The system includes a first sensor configured to detect rotation of the periphery of the first wheel based on the first repeating target surfaces(s), and a second sensor configured to detect rotation of the periphery of the second wheel based on the second repeating target surface(s). The system also includes a controller having one or more processors configured to: analyze a first pulse train associated with a signal received from the first sensor corresponding to rotation of the first wheel; analyze a second pulse train associated with a signal received from the second sensor corresponding to rotation of the second wheel; determine a delta phase value for each pulse of the first pulse train with respect to a corresponding pulse of the second pulse train; aggregate each delta phase value for a prescribed period of pulses to determine an aggregate delta phase value; determine a load phase value as a ratio of the aggregate delta phase value to the prescribed period; determine a total delta phase value as a difference between the load phase value and a reference phase value; and determine a torque value from a load applied to the shaft based on the total delta phase value and physical parameters of the shaft.

The details of one or more embodiments are set forth in the accompanying drawings and the description below. Other features and advantages will become apparent from the description, the drawings, and the claims.

BRIEF DESCRIPTION OF THE DRAWINGS

FIG. 5 is a flow diagram illustrating an example method of determining torque applied to a rotating shaft.

Like reference symbols in the various drawings indicate like elements.

DETAILED DESCRIPTION

Figure 1:
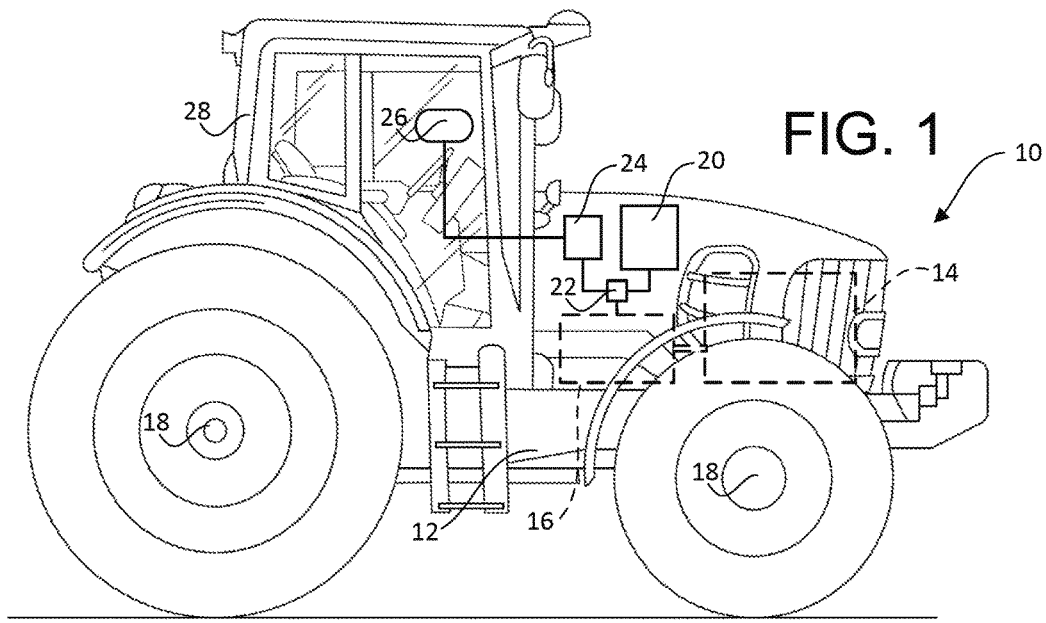
FIG. 1 is side elevational view of a work vehicle in the form of a tractor in which the torque determination system and method according to this disclosure may be incorporated.

The following describes one or more example embodiments of the disclosed method and system for determining torque applied to a rotating shaft. Various modifications to the example embodiments may be contemplated by one of skill in the art.

The term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

This disclosure pertains to a system and method for determining the magnitude of torque (e.g., an unknown or hypothetical torque) applied to a rotating shaft by an analysis of the phase difference at each pulse of two pulse trains generated by rotation of the shaft. The pulse trains are generated by sensing repeating target surfaces at two axially spaced apart locations with respect to the loaded shaft. In some embodiments, the repeating target surfaces may be on the shaft itself or on an extension of the shaft that co-rotates with the loaded shaft. In other embodiments, the repeating target surfaces are on a component this is offset from, but co-rotates with, the loaded shaft such that the target surfaces pass at a frequency that is equivalent to that of the corresponding axial position of the loaded shaft. In other works, the target surfaces need not be physically located on the loaded shaft (or extension thereof), but may on another, unloaded shaft (or extension thereof) such that the loaded shaft phase difference is determined based on sensing of one or more unloaded shafts. This disclosure thus contemplates that various arrangements (e.g., various gear sets) may be included to maintain a consistent rotation (i.e., common target surface pass frequency) between the loaded shaft and one or more unloaded shafts.

In certain embodiments, the repeating target surfaces sensed as a part of the difference determination may be in the form of a set (e.g., a pair) of disks or wheels with undulating peripheries (e.g., curved or rectilinear toothed, grooved, notched, castellated, etc.) mounted to the same or different rotating shafts at different axial positions. Sensors (e.g., magnetic induction (or Hall effect) sensors, optical sensors, etc.) may detect the alternating projections of the undulating peripheries and output corresponding signals that may be digitized into a set (e.g., a pair) of pulse trains. With the load applied to the shaft, the phase difference (in terms of time or degrees/radians) for corresponding pairs of pulses in two pulse trains may be determined and aggregated over a prescribed time period and sampled at one or more intervals. The value of the torque applied to the rotating shaft may then be derived by assessment of this loaded phase difference value at specific times or intervals.

In other embodiments, rather than detecting target surfaces formed by physical undulating surfaces (e.g., teeth), the disclosed system and method may generate pulse trains by sensing other features on or mounted to the loaded (or other) shaft(s). For example, various target surfaces in a repeating alignment or arrangement on or mounted to the loaded (or other) shaft(s) may be sensed. Such target surfaces may be at the same or similar radius with respect to the axis of the loaded (or other) shaft(s). Such repeating target surfaces, for instance, may interact with the sensors optically or magnetically in a manner in which undulating peripheries are not required, such as forming a repeating arrangement of reflective or magnetic surfaces, which are separated by non-reflective or magnetic surfaces, along a circumferential surface or otherwise at a common radius. It may further be possible for the pulse trains to be generated by sensing a single target surface at each axial position of the loaded shaft or other shaft(s) that extends along less than the entire circumference of the associated shaft(s) or extension(s) such that rotation thereof provides the repetition.

Among other uses, the torque determination system and method may be incorporated in a work vehicle, and especially for or within an engine or transmission thereof. The values of the torque applied by a load to one or more shafts of the work vehicle (e.g., engine or transmission) may be used to control operational parameters of the work vehicle (e.g., the engine power, transmission gear selection, etc.) in order to improve various aspects of the work vehicle operation (e.g., engine efficiency, fuel economy, load-impact mitigation, etc.).

Referring now to the drawings, the disclosed toque determination system and method may be utilized in the context of a wide range of mobile and fixed applications in which loads are applied to one or more rotating shafts. For example, the disclosed torque determination system and method may be incorporated into various work vehicles, including, agricultural tractors, such as shown in FIG. 1. In this regard, while a tractor is illustrated and described herein as an example work vehicle, one skilled in the art will recognize that principles of the disclosure may be readily adapted for use in other types of non-work and work vehicles, including, for example, various other agricultural machines, and other machines used in the construction and forestry industries, as well as in various non-vehicle applications. As such, the present disclosure should not be limited to applications associated with a tractor or the particular example tractor shown and described.

As shown in FIG. 1, the work vehicle 10 includes a vehicle frame 12. Supported on the vehicle frame 12 is a source of propulsion 14 that supplies power to a transmission 16. In one example, the engine 14 is an internal combustion engine, such as a diesel engine, that is controlled by an engine control module. It should be noted that other forms of propulsion may be provided, such as a fuel cell, an electric motor, a hybrid gas-electric power plant, etc. The transmission 16 transfers the power from the engine 14 to a suitable driveline coupled to one or more drive/driven wheels 18 of the work vehicle 10 to enable the work vehicle 10 to travel over terrain. In certain embodiments, the work vehicle 10 may include an electrohydraulic system with one or more hydraulic pumps 20 and electrohydraulic valves 22 operated by one or more controllers (e.g., controller 24) having processor and memory architecture suitable to control operational modes of the transmission 16 and/or the engine 14. Information related to the engine 14 and the transmission 16 (e.g., current drive mode or gear) can be relayed to the operator via an operator interface 26 (e.g., display screen) in an operator cabin 28.

Figure 2:
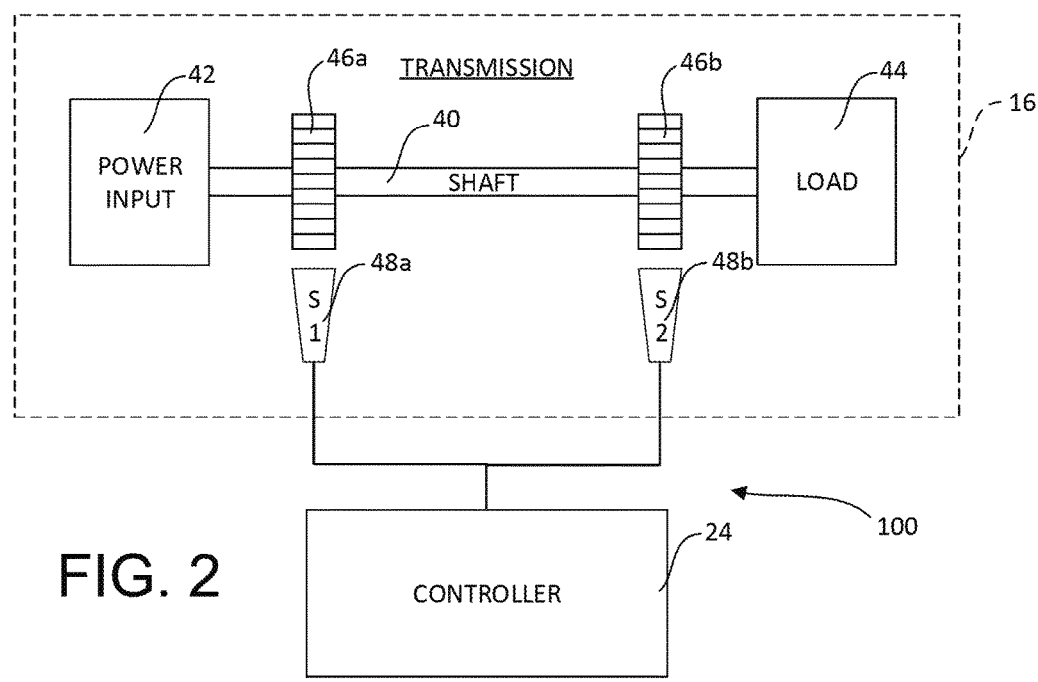
FIG. 2 is a simplified schematic view of an example transmission of the work vehicle of FIG. 1 incorporating the disclosed torque determination system and method.
Figure 3:
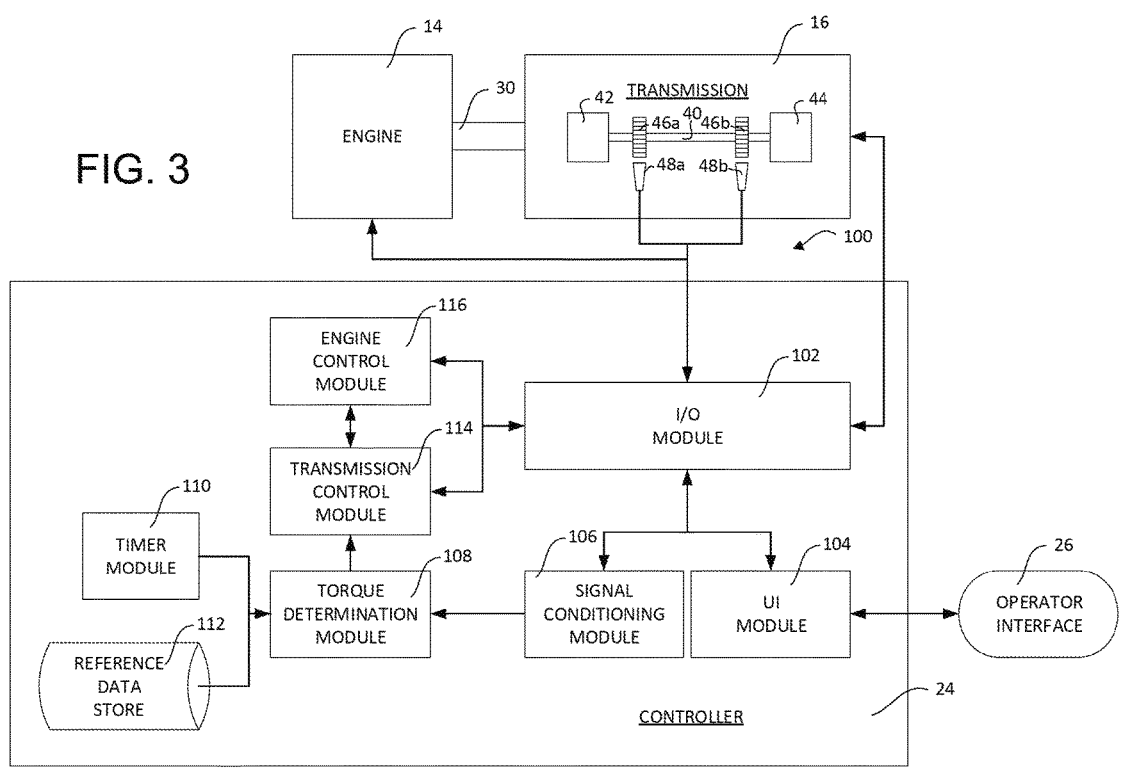
FIG. 3 is simplified schematic view of an example work vehicle control system incorporating the disclosed torque determination system and method.

Referring also to FIGS. 2 and 3, the transmission 16 may include one or more gears (not shown) for forward and rearward motion of the work vehicle 10, including multiple forward and reverse range gears for propelling the work vehicle 10 at various speeds. In order to transition between gears, the transmission 16 may include various clutches and synchronizers (not shown). The clutches and synchronizers may be selectively coupled to the drive shaft 30 so that that the drive shaft 30 may be rotated relative to the gears until a selected gear is engaged by the synchronizer. In this way, engine torque is applied through the drive shaft 30 (and associated clutches and synchronizers), and when engaged, to a selected gear. The selected gear couples the drive shaft 30 to the wheels 18 (e.g., via a transaxle and differential assembly) to power rotation of the wheels 18 and propel the work vehicle 10 across the terrain. It should be understood that, while the drawings and discussion reference application of the disclosed torque determination system and method with respect to the torque load applied by engagement of the ground wheels 18, the disclosed system and method may also be utilized to determine torque applied by non-propulsion loads. For example, the engine may also be coupled directly or via the transmission to a work implement (not shown) via a PTO shaft (not shown) or other component not used for propulsion of the work vehicle 10.

The magnitude of torque applied to the engine 14 when the drive shaft 30 is coupled to the wheels 18 via the transmission 16 (or coupled to a work implement via the PTO shaft) may vary and be unknown during all or some of the operation of the work vehicle 10. Some conventional systems measure shaft torque using various techniques that may be less suitable in work vehicle applications (e.g., techniques employing strain gauges, structural acoustic waves, magnetorestriction, eddy currents, etc.) for various reasons (e.g., lack of robustness, difficulty in obtaining and transmitting a useable signal, cost, etc.). The disclosed system and method may be utilized efficiently to determine the amount of torque applied to the engine or various intermediate components by assessing the amount of torsion or angular twist about a rotation axis of a rotating shaft between two positions along the rotation axis. By analyzing the phase difference of each corresponding pulse pairs in pulse trains generated at different axial positions along the shaft, the disclosed system and method may derive the applied torque value with an enhanced accuracy, and thereby provide for enhanced control of operational parameters of the work vehicle 10.

In the illustrated example, within the transmission 16 (e.g., a gear case or housing thereof) are mounted gears and various rotating shafts. For simplicity, a single transmission shaft 40 is depicted in FIG. 2. The transmission shaft 40 is coupled to the engine 14 and drive shaft 30 as represented by a power input component 42. The other end of the transmission shaft 40 is coupled to the wheels 18 (or other non-propulsion work component) as represented by a load component 44. Between the power input component 42 and the load component 44 are two disks or wheels, including a first wheel 46a and a second wheel 46b, mounted (directly or via an intermediate member) to the transmission shaft 40 in a suitably fixed manner (e.g., permanent weldment, interference splined connection, etc.) such that the first and second wheels 46a, 46b co-rotate with the transmission shaft 40. Detectors, such as a first sensor 48a and a second sensor 48b, may be mounted within the transmission 16 to detect rotation, and thereby the angular position of, the first and second wheels 46a, 46b, respectively. It should be noted that while the illustrated example of the disclosed system and method is contained in the transmission housing, it could be incorporated in various other components of the work vehicle 10 (e.g., engine, motor, axle, final drive, or other assembly of the driveline or the power train to a work implement having a rotating shaft). The sensors 48a, 48b are electrically coupled to the controller 24.

The wheels 46a, 46b may be of any suitable type and configuration. The wheels 46a, 46b may each be a disk-shaped or annular member (e.g., generally a "gear" or "tone wheel") with an outer periphery (e.g., an outer diameter in the case of a circular disk or annular member) that has a radially-varied or undulating configuration. In certain embodiments, the wheels 46a, 46b are of the same configuration, each being a circular disk with an undulating outer periphery forming alternating radially-extending projections and recesses along the circumference of the disk. The undulating periphery may, for example, have a notched, slotted, grooved, castellated, faceted or toothed configuration. As shown in FIG. 2, the wheels 46a, 46b may be located at or near the ends of the transmission shaft 40 proximate the power input component 42 and the load component 44, respectively. They may also be located along the shaft 40 in different locations and relative axial positions. In certain cases, however, the axial positioning of the wheels 46a, 46b may be such that they are preferentially spaced to enhance the sensitivity of the system according to the expected torsion and/or length of the shaft in a particular application. For example, more axial spacing may be preferred in relatively low-torsion and/or long-shaft applications to enhance the system sensitivity to detect the correspondingly low phase variance. Less axial spacing may be allowed or needed in high-torque and/or relatively short-shaft applications. Further, it should be understood that while the example embodiments illustrated and described herein have the wheels mounted to the same shaft for which torque is being measured, in other configurations, one or both of the wheels may be arranged on one or more different shafts. In such cases, various arrangements (e.g., various gear sets) may be included to maintain a consistent rotation angle (e.g., to maintain a common angular orientation pass frequency) between each offset wheel and the corresponding axial position along the loaded shaft.

The sensors 48a, 48b may be any suitable type and configuration suitable to discern the rotation of the wheels 46a, 46b, and thereby the transmission shaft 40, and any corresponding variance in the angular position of one wheel 46a with respect to the other wheel 46b, and to generate electric output signals corresponding to the alternating close and near presence of the undulating peripheries as the wheels 46a, 46b rotate. In the illustrated example, the sensors 48a, 48b are magnetic induction or Hall effect type sensors, which generate nominal output voltages in response to the relative proximity of the alternating projections of the outer peripheries of the wheels 46a, 46b, which in the illustrated example, each have a castellated periphery. In this case, the sensitivity of the sensors 48a, 48b may be affected by the positioning (e.g., orientation, alignment, spacing, etc.) of the sensors 48a, 48b with respect to the corresponding wheels 46a, 46b as well as the profile of the wheel peripheries and the speed of shaft rotation in that such factors affect the induced voltage, which in turn affects the relative peak-to-peak voltage between the sensors 48a, 48b as well as the phase delay between the analog signals generated by the sensors 48a, 48b and the digital pulse trains processed by the controller 24. It should be understood that various other sensor types and operational principles may be used with the disclosed torque determination system and method. For example, the sensors may be optical sensors which detect rotation and generate output signals based upon sensing the presence or absence of reflected or emitted light (e.g., in the visible, ultraviolet, infrared or other ranges of the electromagnetic spectrum), or sensing such light having a characteristic (e.g., intensity, brightness, etc.) beyond or within a threshold value or range. Other types of sensors may also be used.

In the illustrated example, the transmission 16, with the example control system 100, including the aforementioned transmission shaft 40, power input component 42, load component 44, wheels 46a, 46b, and sensors 48a, 48b, are mechanically coupled to the engine 14 via the drive shaft 30 and electrically coupled to the controller 24 via suitable electrical lines (e.g., cabling, bus, etc.). Referring to FIG. 3, a simplified dataflow diagram illustrates the example control system 100 for the work vehicle 10, which may incorporate the torque determination system and method either as embedded within or augmenting the controller 24 either locally on the work vehicle 10 or remotely off the machine using any of various known wireless transmission protocols. Various embodiments of the control system 100 according to the present disclosure may include any number of other modules or sub-modules embedded within or augmenting the controller 24 that may be combined and/or further partitioned. Inputs to the control system 100 may be received from the sensors 48a, 48b, the operator interface 26 and other control modules (not shown) associated with the work vehicle 10, and/or determined/modeled by other sub-modules (not shown) within the controller 24 (or other controllers). In various embodiments, the controller 24 includes an input/output (I/O) module 102, a user interface (UI) module 104, a signal conditioning (SC) module 106, a torque determination (TD) module 108, a timer module 110, a reference data store 112, a transmission control (TC) module 114, and an engine control (EC) module 116.

The I/O module 102 and the UI module 104 receive input data from one or more sources. Among other things, the I/O module 102 may receive input data in the form of electrical signals from the sensors 48a, 48b, as will be detailed below. The UI module 104 receives input data from the operator via the operator interface 26, which in turn may transmit and receive data to and from the I/O module 102 and the operator interface 26. The input data may include any type of machine control inputs (and others) for controlling operation of the work vehicle 10 and its implements. In certain embodiments, the UI module 104 may also output one or more notifications to the operator interface 26 (e.g., in the form of audible, tactile and/or visual notifications) to notify the operator of various aspects of the work vehicle 10 and/or the control system 100.

Figure 4:
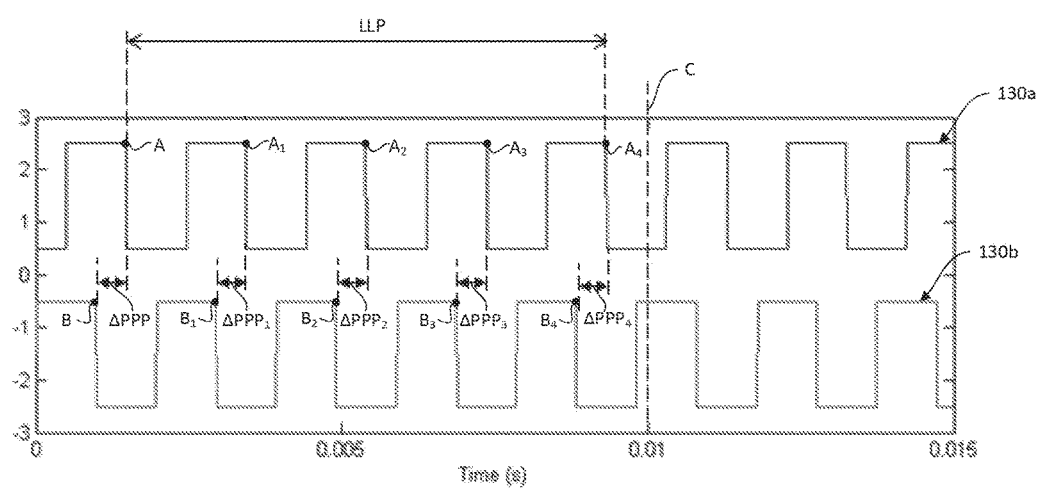
FIG. 4 is a graph illustrating two example pulse trains generated by operation of the disclosed torque determination system and method.

The I/O module 102 receives and transmits the input data from the sensors 48a, 48b to the SC module 106. The SC module 106 includes circuitry configured to process the raw analog signals from the sensors 48a, 48b to, at minimum, digitize the analog signals, for example, converting raw sinusoidal sensor input signals to square wave pulse trains. The SC module 106 may further process the sensor signals with various filtering techniques to better form and differentiate the resulting pulse trains for further processing. FIG. 4 illustrates two example pulse trains 130a, 130b that may be generated from the signals received from the sensors 48a, 48b, respectively.

After the sensor signals are digitized and conditioned, the resulting pulse trains 130a, 130b are relayed to the TD module 108. The TD module 108 includes circuitry that analyzes the pulse trains 130a, 130b and carries out the control logic for the steps of a torque determination method 200, an example flow diagram for which is shown in FIG. 5, and which will be detailed below. In carrying out the torque determination method 200, the TD module 108 receives input from the timer module 110, which may establish and increment one or more clock timers or counters, and information from the reference data store 112, such as various physical parameters (e.g., shaft length, polar moment of inertia, modulus of rigidity, etc.) associated with the pertinent shaft (e.g., transmission shaft 40) as well as one or more stored values corresponding to a reference phase value. The reference phase value may, for example, correspond to a phase value of the pertinent shaft (e.g., transmission shaft 40) when rotating without an applied load.

After the TD module 108 has carried out the prescribed method of determining applied torque, one or more torque values may be passed to the TC module 114 and/or the EC module 116. One or both of these modules may process the torque values to resolve one or more control commands, which are transmitted via the I/O module 102 to one or more actuators within or otherwise controlling various aspects of the engine 14 and/or the transmission 16. As one example, the TC module 114 may resolve commands for the transmission 16 to shift gears, such as to shifting to a lower gear in response to receiving a torque value falling within a specified torque band or above a threshold torque rating of the current gear. As another example, the EC module 116 may resolve commands for the engine 14 that de-rates the output power of the engine 14 in response to receiving a torque value falling within a specified torque band or below a threshold torque value at which normal engine rating would be employed. In both cases, the torque determination system 100 may be used to improve the operational efficiency of the work vehicle 10. Further, the UI module 104 may also output data to the operator interface 26 to provide the operator of the work vehicle 12 with the updated vehicle state information following any changes made to the engine 14 or transmission 16 as a result of the torque determination.

Referring now also to FIG. 5, a flow diagram illustrates various steps of the torque determination method 200. As can be appreciated in light of the disclosure, the order of operation within the method 200 is not limited to the depicted sequential execution, but may be performed in one or more varying orders as applicable and in accordance with the present disclosure.

As noted above and shown in FIG. 4 with respect to the illustrated example, rotation of the transmission shaft 40 will effect a pair of pulse trains 130a, 130b. As also noted, in the illustrated example, the wheel and sensor pair 46a, 48a are the same as the wheel and sensor pair 46b, 48b, and are set up in a like manner except for the difference in their axial positions along the transmission shaft 40. Thus, each pulse train 130a, 130b may have the same (or similar) period, the same (or similar) amplitude, and the same (or similar) pulse count within the sampling period, which in the illustrated example is 10 milliseconds (ms).

In the illustrated example, the phase differences between the pulse pairs of the pulse trains 130a, 130b are expressed in terms of time. It will be understood, however, that these values could instead be expressed in degrees or radians, or be unit-less values. At the start of the method 200, the timer module 110 may initiate a timer or clock. The timer module 110 should have an operating frequency that is at least as fast as that of the pulse trains 130a, 130b. The timing circuit may run and increment continuously throughout the method 200. The TD module 108 tracks or "time stamps" a common aspect of each pulse using the count or time value from the timer module 110. In the illustrated example, the falling edge of each pulse train 130a, 130b is time stamped by the TD module 108 by storing a time value in a volatile memory location within the TD module 108 or elsewhere.

In the example shown in FIG. 5, the method 200 begins at 202, and at 204 commences timing of a sampling period. At 206a, 206b, the TD module 108 then identifies (e.g., by an interrupt triggered in the controller 24) the start of the falling edges of the first pulse of the square wave in each of the pulse trains 130a, 130b, points A and B in FIG. 4, respectively. In this example, point B is earlier in time than point A, however, this could be otherwise (i.e., at the same time or point B could be later). At 208, the TD module 108 marks the time for the start of the first pulse of the sensor 1 pulse train 130a by setting a variable "T1First" equal to the current time of the timer module 110 at point A. The T1First variable is used to mark the beginning of the combined period of the pulses tracked during the sampling period. It should be noted, however, that this combined period could be commenced from the beginning of the falling edge of the second sensor pulse train 130b, by setting the time of a variable "T2First" equal to the current time of the timer module 110 at point B. Then at 210a, 210b, the TD module 108 sets variables "T1Last" and "T2Last" equal to the current time at points A and B, respectively.

At 212, the TD module 108 computes the phase difference between the first pulse pair of the first and second pulse trains 130a, 130b and sets a variable "ΔPPP" equal to the difference because the current values of variables T2Last and T1Last. At 214, the TD module 108 sets this value as the initial value of an aggregate or running total variable "ΣΔPPP." At 216, the TD module 108 checks to see if the sampling period has been reached by the timer module 110, which, as noted, may be 10 ms in the illustrated example, or time "C" in FIG. 4. If not, the TD module 108 continues to compute a ΔPPP value (waiting as needed for the next falling edge) for each subsequent pulse (at 212), and aggregates the individual pulse pair phase differences (or delta time values) during the current sampling period (at 214). In other words, the TD module 108 computes $\Delta PPP_1$, $\Delta PPP_2$, $\Delta PPP_3$, and $\Delta PPP_4$ for the difference between the time (or phase) of each of the pulse pairs at points $A_1$-$B_1$, $A_2$-$B_2$, $A_3$-$B_3$ and $A_4$-$B_4$ of the pulse trains 130a, 130b, as shown in FIG. 4.

At 218, at the end of the first sampling period, the method 200 determines a combined period or "load phase period (LPP)" value by summing the periods of the individual pulses during the sampling period, which the TD module 108 computes as the difference between the values of the variables T1Last and T1First. Again, it should be noted that alternatively the combined period may be derived by the difference between the first and last pulses in the second sensor pulse train 130b. Further, for constant period pulses (such as derived from consistently spaced undulations in the wheels 46a, 46b), the combined period (i.e., the LPP value) may be computed by multiplying the period of one pulse by the total pulse count of either pulse train 130a, 130b during the sampling period. Additionally or alternatively, various averaging techniques may be applied to obtain an LLP value with less dependency on individual wheel tooth spacing. For example, the LLP value may be computed as half the sum of the T1Last-T1first difference and the T2Last-T2First difference.

At 220, the TD module 108 uses the LPP value to compute a unit-less load phase ratio "LP" equal to the aggregate pulse pair phase differences (ΣΔPPP) divided by the load phase period (LPP). At 222, the TD module 108 computes a total phase difference value "ΔTP," which is or approximates the total angular deflection of the pertinent shaft (e.g., transmission shaft 40) from the applied load, as the difference between the LP value and a reference phase value "RP." In the illustrated example, the RP value corresponds to a phase value of the transmission shaft 40 in an unloaded state. This value may be derived from factory measurements and stored in the reference data store 112 for later access by the TD module 108. Other reference values may be contemplated, however, based on a known state of the transmission shaft 40. At 224, the TD module 108 computes torque "T" as the product of ΔTP and a constant "2πK/Z." The constant K is derived from physical properties of the pertinent shaft (e.g., transmission shaft 40), specifically, including the length "L," polar moment of inertia "J" and modulus of rigidity "G" of the transmission shaft 40. "Z" is the number of pulses per revolution of the wheel. The constant K is expressed as the ratio of (J×G)/L, and thus, the torque T applied by the load on the transmission shaft 40 is computed as (2π×ΔTP×J× G)/(L×Z). These computations assume a reference phase shift for a zero load. However, if the reference phase is for a torque of TRef, then the torque may be computed as (2π×ΔTP×J×G)/(L×Z)+TRef.

The method 200 may terminate after one or a set number of iterations of the sampling period after operation of the work vehicle 10 or the pertinent component thereof (e.g., the transmission) has commenced, or after a change of state has occurred (e.g., gear shift, engine de-rating, PTO engagement, etc.). Alternatively, the method 200 may repeat continuously during operation, in which case each pulse pair of the pulse trains 130a, 130b is assessed for phase differences, the phase differences are aggregated within each sampling period, and then this process is repeated for each sampling period. At 226, the TD module 108 queries whether the stored logic dictates sample repeat, and if so, the TD module 108 starts a new sampling period, and at 228, resets the first pulse time by setting the variable T1First equal to the current value of the variable T1Last. If the method 200 is to be a single pass only, or if no further sample iterations are to be undertaken, at 230, the torque determination method 200 may end.

Although not shown in FIG. 5, the torque determination method 200 just described may be continued (or, alternatively, a new control method may be initiated) by supplying the determined torque values to the TC module 114 and/or the EC module 116, which may then utilize the determined torque values to execute various control commands to implement refinements to the state of the engine 14 and/or the transmission 16 in order to improve the operation of the work vehicle 10. The disclosed method 200 thus provides an accurate torque value determination by consideration and analysis of phase difference on a per pulse basis, in which the pulse pair phase differences are aggregated before comparison to a baseline reference value. Further, the disclosed method 200 achieves this enhanced accuracy while optimizing processor utilization by using only additive or subtractive operations for the individual per-pulse phase (or time) computations, and further by the aggregating and sampling of the per-pulse phase differences at prescribed periods.

In the foregoing description of the method 200, the timer module 110 maintains a running clock or time, and the TD module 108 sets the various variables (e.g., T1Last, T2Last, etc.) as time values. However, instead, the timer module 110 may initiate and increment a counter. In this case, wherein the TD module 108 records the counter value at the falling edge of each pulse of the pulse trains 130a, 130b, and the pulse pair phase difference (ΔPPP) is a difference between a first counter value for each pulse of the first pulse train 130a and a second counter value for each pulse of the second pulse train 130b. The aggregate delta phase value (ΣΔPPP) is an aggregation of individual counter differences for corresponding pulse pairs of the first and second pulse trains. Like above, the timer module 110 has an operating frequency that is at least as fast as that of the pulse trains 130a, 130b. For example, in the illustrated example, the pulses have a period of about $2.5 \times 10^{-3}$, and, for example, a 40 MHz timing circuit may be used that increments the counter value by an arbitrary unit, such as one count for every $2.5 \times 10^{-8}$ seconds (i.e., $\frac{1}{40,000,000}$)

In the illustrated example, the period of each pulse in the pulse trains has a shorter duration than the sampling period. This permits the value of LPP to be non-zero in that at least one pulse occurs during the sampling period per pulse train, and thus permits torque to be derived. It should be noted that if the pulse period should happen to be longer than the sampling period, a ΔPPP value may still be obtained, however, a new torque value may not be calculated. In this case, the controller 24 may include control logic calling for the TC module 114 and/or the EC module 116 (and any other modules or components) to use the last determined torque value (which may be stored in memory). It should also be noted also that the various phase difference values described above may alternatively be described as angular displacement values, expressed in terms of time, or alternatively in degrees/radians.

Thus, various example embodiments of the disclosed system and method have been described by which the value of torque applied to a rotating shaft may be determined. The system and method assess torque by sensing torsion or angular displacement at one axial position of the shaft with respect to another. The torque is determined based upon the phase difference between electrical signals generated by sensors detecting the rotation, and thereby the angular position, of shaft-mounted wheels. The system and method further includes an investigation of the difference in phase for each corresponding pair of pulses in the pulse trains generated by the wheel and sensor pairs. The individual pulse pair phase differences are aggregated over a sampling period, after which the aggregate phase difference is compared to a reference phase value, such as the phase value of an unloaded state of the shaft. A constant based on physical parameters of the shaft is applied to the difference between the aggregate and reference phase values to derive the applied torque. The derived torque value may then be used in various ways, such as to improve operating performance of a work vehicle.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A method of determining torque applied to a rotating shaft by a load, comprising:

providing a first wheel mounted to the shaft at a first axial position, the first wheel having an undulating periphery; and providing a second wheel mounted to the shaft at a second axial position, the second wheel having an undulating periphery;

detecting, via a first sensor, a rotation of the periphery of the first wheel at the first axial position;

detecting, via a second sensor, a rotation of the periphery of the second wheel at the second axial position;

analyzing, via one or more controllers, a first pulse train associated with a signal received from the first sensor corresponding to rotation of the shaft at the first axial position under the load;

analyzing, via the one or more controllers, a second pulse train associated with a signal received from the second sensor corresponding to rotation of the shaft at the second axial position under the load;

determining, via the one or more controllers, a delta phase value for each pulse of the first pulse train with respect to a corresponding pulse of the second pulse train;

aggregating, via the one or more controllers, each delta phase value for a prescribed period of pulses to determine an aggregate delta phase value;

determining, via the one or more controllers, a load phase value as a ratio of the aggregate delta phase value to the prescribed period;

determining, via the one or more controllers, a total delta phase value as a difference between the load phase value and a reference phase value; and determining, via the one or more controllers, a torque value from the load based on the total delta phase value and physical parameters of the shaft;

wherein the aggregate delta phase value is an aggregation of individual counter differences determined by timing circuitry of the controller for corresponding pulses of the first and second pulse trains.

2. The method of claim 1, wherein the individual counter differences are generated from the timer circuitry which increments a counter at a frequency at least equal to a frequency of the pulses of the first and second pulse trains;

wherein the one or more controllers record a counter value at associated aspects of each pulse of the first and second pulse trains; and wherein the delta phase value is a difference between a first counter value for each pulse of the first pulse train and a second counter value for each pulse of the second pulse train.

3. The method of claim 1, wherein the prescribed period of pulses is greater than a period of each pulse of the first and second pulse trains.

4. The method of claim 1, wherein the delta phase value is determined at a period of each pulse of the first pulse train; and wherein the load phase value is determined repeatedly at the prescribed period.

5. A system for determining torque applied to a rotating shaft by a load, comprising:

a first wheel coupled to the shaft at a first axial position, the first wheel having a periphery with one or more first repeating target surfaces;

a second wheel mounted to the shaft at a second axial position axially spaced from the first axial position, the second wheel having a periphery with one or more second repeating target surfaces;

a first sensor configured to detect rotation of the periphery of the first wheel based on the one or more first repeating target surfaces;

a second sensor configured to detect rotation of the periphery of the second wheel based on the one or more second repeating target surfaces; and a controller having one or more processors configured to:
    analyze a first pulse train associated with a signal received from the first sensor corresponding to rotation of the first wheel;
    analyze a second pulse train associated with a signal received from the second sensor corresponding to rotation of the second wheel;
    determine a delta phase value for each pulse of the first pulse train with respect to a corresponding pulse of the second pulse train;
    aggregate each delta phase value for a prescribed period of pulses to determine an aggregate delta phase value;
    determine a load phase value as a ratio of the aggregate delta phase value to the prescribed period;
    determine a total delta phase value as a difference between the load phase value and a reference phase value; and
    determine a torque value from a load applied to the shaft based on the total delta phase value and physical parameters of the shaft;
    wherein the aggregate delta phase value is an aggregation of individual counter differences determined by timing circuitry of the controller for corresponding pulses of the first and second pulse trains.

6. The system of claim 5, wherein the individual counter differences are generated from the timer circuitry which increments a counter at a frequency at least equal to a frequency of the pulses of the first and second pulse trains;
    wherein the controller records a counter value at associated aspects of each pulse of the first and second pulse trains; and
    wherein the delta phase value is a difference between a first counter value for each pulse of the first pulse train and a second counter value for each pulse of the second pulse train.

7. The system of claim 5, wherein the prescribed period of pulses is greater than a period of each pulse of the first and second pulse trains.

8. The system of claim 5, wherein the delta phase value is determined at a period of each pulse of the first pulse train; and
    wherein the load phase value is determined repeatedly at the prescribed period.

9. A system for determining torque applied to a rotating shaft by a load, comprising:
    a first wheel mounted to the shaft at a first axial position and having an undulating periphery; and
    a second wheel mounted to the shaft at a second axial position and having an undulating periphery;
    a first sensor configured to detect rotation of the periphery of the first wheel at the first axial position;
    a second sensor configured to detect rotation of the periphery of the second wheel at the second axial position axially; and
    a controller having one or more processors configured to:
        analyze a first pulse train associated with a signal received from the first sensor corresponding to rotation of the shaft at the first axial position;
        analyze a second pulse train associated with a signal received from the second sensor corresponding to rotation of the shaft at the second axial position;
        determine a delta phase value for each pulse of the first pulse train with respect to a corresponding pulse of the second pulse train;
        aggregate each delta phase value for a prescribed period of pulses to determine an aggregate delta phase value;
        determine a load phase value as a ratio of the aggregate delta phase value to the prescribed period;
        determine a total delta phase value as a difference between the load phase value and a reference phase value; and
        determine a torque value from a load applied to the shaft based on the total delta phase value and physical parameters of the shaft;
        wherein the aggregate delta phase value is an aggregation of individual counter differences determined by timing circuitry of the controller for corresponding pulses of the first and second pulse trains.

10. The system of claim 9, wherein the individual counter differences are generated from the timer circuitry which increments a counter at a frequency at least equal to a frequency of the pulses of the first and second pulse trains;
    wherein the controller records a counter value at associated aspects of each pulse of the first and second pulse trains; and
    wherein the delta phase value is a difference between a first counter value for each pulse of the first pulse train and a second counter value for each pulse of the second pulse train.

11. The system of claim 9, wherein the prescribed period of pulses is greater than a period of each pulse of the first and second pulse trains.

12. The system of claim 9, wherein the delta phase value is determined at a period of each pulse of the first pulse train; and
    wherein the load phase value is determined repeatedly at the prescribed period.

13. The system of claim 9, wherein the undulating peripheries of the first and second wheels include rectilinear surfaces.

* * * * *